(12) United States Patent  
Black et al.

(10) Patent No.: US 8,317,106 B2  
(45) Date of Patent: Nov. 27, 2012

(54) ATTACHMENT ARRANGEMENT

(75) Inventors: Donald Black, Edinburgh (GB); John Paul McKeown, Edinburgh (GB); Mark-Paul Buckingham, Edinburgh (GB)

(73) Assignee: Reactec Limited, Edinburgh (GP)

( * ) Notice: Subject to any disclaimer, the term of this patent is extended or adjusted under 35 U.S.C. 154(b) by 173 days.

(21) Appl. No.: 12/865,785

(22) PCT Filed: Feb. 3, 2009

(86) PCT No.: PCT/GB2009/050100  
§ 371 (c)(1),  
(2), (4) Date: Nov. 11, 2010

(87) PCT Pub. No.: WO2009/098504  
PCT Pub. Date: Aug. 13, 2009

(65) Prior Publication Data  
US 2011/0049247 A1    Mar. 3, 2011

(30) Foreign Application Priority Data

Feb. 8, 2008  (GB) .................................. 0802380.6  
Aug. 15, 2008  (GB) .................................. 0814950.2

(51) Int. Cl.  
*G06K 7/00*    (2006.01)

(52) U.S. Cl. ....................................................... 235/486

(58) Field of Classification Search .................. 235/492, 235/435, 439, 486; 248/224.8  
See application file for complete search history.

(56) References Cited

U.S. PATENT DOCUMENTS

| 5,261,758 A | 11/1993 | Vranish |
| 2010/0308192 A1* | 12/2010 | Spratte et al. ............... 248/224.8 |

FOREIGN PATENT DOCUMENTS

| CA | 2101837 A1 | 2/1995 |
| JP | 2007209529 A | 8/2007 |
| WO | WO-2007/072068 A2 | 6/2007 |
| WO | WO-2007080438 A1 | 7/2007 |

OTHER PUBLICATIONS

Moyle, Jonathan, "International Search Report" for PCT/GB2009/050100 as mailed Oct. 18, 2010, 3 pages.

* cited by examiner

*Primary Examiner* — Seung Lee  
(74) *Attorney, Agent, or Firm* — Winstead PC (57) ABSTRACT

The present invention relates to an attachment arrangement that comprises a body, an attachment component and a fastener. One of the body (20) and the attachment component defines a protrusion (22) and the other of the body (20) and the attachment component defines a recess configured to receive the protrusion (22). The fastener is operative to resist separation of the body (20) and the attachment component when the protrusion (22) is received in the recess. Each of the protrusion (22) and the recess defines a surface profile (28, 30) with the surface profiles cooperating with each other to force the body (20) and the attachment component progressively apart from each other against the operation of the fastener as the body (20) and the attachment component are rotated in relation to each other when the protrusion (22) is received in the recess. The body (20) and the attachment component are rotated about an axis that extends in substantially a same direction as a direction in which the body (20) and the attachment component move together and apart when the protrusion (22) is being received in and removed from the recess.

20 Claims, 4 Drawing Sheets

ATTACHMENT ARRANGEMENT

FIELD OF THE INVENTION

The present invention relates to an attachment arrangement, to sensor apparatus comprising an attachment arrangement and to an operative device, such as a hand-held power tool, comprising an attachment arrangement.

STATEMENT OF INVENTION

According to a first aspect of the present invention, there is provided an attachment arrangement comprising a body, an attachment component and a fastener,
- one of the body and the attachment component defining a protrusion and the other of the body and the attachment component defining a recess configured to receive the protrusion,
- the fastener being operative to resist separation of the body and the attachment component when the protrusion is received in the recess,
- each of the protrusion and the recess defining a surface profile, the surface profiles cooperating with each other to force the body and the attachment component progressively apart from each other against the operation of the fastener as the body and the attachment component are rotated in relation to each other when the protrusion is received in the recess, the body and the attachment component being rotated about an axis that extends in substantially a same direction as a direction in which the body and the attachment component move together and apart when the protrusion is being received in and removed from the recess.

In use, relative rotation of the body and the attachment component causes the cooperating surface profiles of the protrusion and the recess to force the body and the attachment component progressively apart to thereby allow for separation of the body and the attachment component. Hence, separation of the body and the attachment component can be more readily accomplished with one-handed operation. This is because relative rotation of the body and the attachment component to effect separation can be accomplished with one hand. Also, relative rotation of the body and the attachment component to effect separation may involve less force than pulling the body and the attachment component apart without relative rotation and against the operation of the fastener. The operation of the cooperating surface profiles in forcing the body and the attachment component apart may be considered analogous to the mechanical advantage gained by a lever. The cooperating surface profiles may be configured to allow for relative rotation of the body and the attachment component.

The body may comprise the protrusion and the attachment component may comprise the recess.

Alternatively or in addition, the protrusion and the recess may have substantially a same shape at least in part.

Alternatively or in addition, the recess may define a mouth which lies substantially entirely in a single plane.

Alternatively or in addition, respective surfaces of the protrusion and the recess may be adjoining when the protrusion is fully received in the recess.

Alternatively or in addition, at least one of the protrusion and the recess may have an asymmetric footprint in a plane extending substantially orthogonally to a direction in which the body and the attachment component move apart and together.

Alternatively or in addition, at least one of the protrusion and the recess may have a surface profile that describes at least part of an elliptical path having an eccentricity of more than zero. The surface profile may lie in a plane that extends substantially orthogonally to a direction in which the body and the attachment component move together and apart. Thus, the configuration of the surface profiles may provide for relative rotation of the body and the attachment component. The elliptical path may extend entirely around the recess or protrusion. Each of the at least one of the protrusion and the recess may have a plurality of surface profiles, the surface profiles defining different parts of a same ellipse having an eccentricity of more than zero. More specifically, each of the at least one of the protrusion and the recess may have two surface profiles, each describing a different part of a same ellipse having an eccentricity of more than zero. First and second of the surface profiles may be disposed on opposing sides of the recess and/or protrusion.

Alternatively or in addition, the protrusion and the recess may define respective surface profiles, which cooperate with each other such that the body and the attachment component have a predetermined orientation with respect to each other when the protrusion is received in the recess, the predetermined orientation being about an axis extending in substantially the same direction as a direction along which the body and the attachment component move apart and together. Thus, a component, such as a magnet, in one of the body and the attachment component may be properly oriented with respect to another component, such as a member of ferromagnetic material, in the other of the body and the attachment component.

Alternatively or in addition, the protrusion may define a substantially first planar surface and the recess may define a substantially second planar surface, each of the first and second planar surfaces extending substantially parallel to each other and being adjacent to each other when the protrusion is received in the recess.

More specifically, the first planar surface may define a furthest extent of the protrusion and the second planar surface may define a greatest depth of the recess.

Alternatively or in addition, each of the first and second planar surfaces may lie in a respective plane that is substantially orthogonal to a direction along which the body and attachment component move apart and together.

Alternatively or in addition, the protrusion and the recess may be configured such that a location on a first of the protrusion and the recess travels progressively along a surface profile of a second of the protrusion and the recess upon relative progressive rotation of the body and the attachment component in a first direction.

More specifically, the protrusion and the recess may be configured such that surface profiles of the protrusion and the recess travel progressively along each other upon relative progressive rotation of the body and the attachment component in a second, opposite direction.

Alternatively or in addition, the protrusion may define a first oppositely directed surface and a second oppositely directed surface, the first and second oppositely directed surfaces facing in generally opposite directions. The first and second oppositely directed surfaces may present an obstacle to separation of the body and the attachment component by means of shear forces in directions which are orthogonal to the direction in which the body and the attachment component move together and apart and in which the first and second oppositely directed surfaces generally face.

More specifically, each of the first and second oppositely directed surfaces may be arcuate such that each defines a convex surface.

More specifically, radii of curvature of the each of the first and second oppositely directed surfaces may vary progressively along the surface in a direction orthogonal to the radii of curvature.

More specifically, a radius of curvature may be greater at a centre of the surface than a radius of curvature towards ends of the surface.

Alternatively or in addition, the first and second oppositely directed surfaces may be substantially symmetrical about a plane that extends substantially along a same direction as a direction along which the body and the attachment component move together and apart.

Alternatively or in addition, the first and second oppositely directed surfaces may be inclined towards each other progressing across the surfaces towards a distal portion of the protrusion. For the avoidance of doubt, the word distal as used herein means situated furthest from the point of attachment of the protrusion to, for example, the base portion.

Alternatively or in addition, the first and second oppositely directed surfaces may form long sides of the protrusion.

Alternatively or in addition, each of the first and second oppositely directed surfaces may describe different parts of an elliptical path, the elliptical path lying in a plane substantially parallel to a direction along which the body and the attachment component move apart and together.

More specifically, the elliptical path described in part by the first and second oppositely directed surfaces may have an eccentricity of more than zero.

Alternatively or in addition, the protrusion may define a third and fourth oppositely directed surfaces, the third and fourth oppositely directed surfaces facing in generally opposite directions.

More specifically, each of the third and fourth oppositely directed surfaces may face generally perpendicularly to the first and second oppositely directed surfaces.

Alternatively or in addition, each of the third and fourth oppositely directed surfaces may be arcuate such that each defines a convex surface.

More specifically, a radius of curvature of each of the third and fourth oppositely directed surfaces may be substantially 14.5 mm.

Alternatively or in addition, each of the third and fourth oppositely directed surfaces may describe a substantially circular path in part in a plane extending substantially orthogonally to a direction along which the body and the attachment component move apart and together.

More specifically, the circular path described by the third and fourth oppositely directed surfaces may have substantially a same radius of curvature. Thus, the curvature and the relative disposition of the third and fourth oppositely directed surfaces may be such as to provide for and constrain the relative progressive rotation of the body and the attachment component that provides for the forcing apart of the body and the attachment component.

Alternatively or in addition, each of the third and fourth oppositely directed surfaces may extend at an angle of no more than 15° to a direction along which the body and the attachment component move apart and together.

More specifically, each of the third and fourth oppositely directed surfaces may extend at an angle of substantially 3.6° to the direction along which the body and the attachment component move apart and together.

Alternatively or in addition, each of the third and fourth oppositely directed surfaces may extend substantially along a direction in which the body and the attachment component move apart and together. Thus, where the protrusion defines a substantially first planar surface, each of the third and fourth oppositely directed surfaces may extend away from a proximal portion of the protrusion along a direction that is substantially orthogonal to the first planar surface. For the avoidance of doubt, the use of the word proximal herein means situated close to the point of attachment of the protrusion to, for example, the base portion. Thus, the third and fourth oppositely directed surfaces present an obstacle to the separation of the body and the attachment component by means of shear forces such as may be exerted by vibration caused, for example, by a power tool. The curvature of the third and fourth oppositely directed surfaces may present an obstacle to separation by means of shear forces in two orthogonal directions.

Alternatively or in addition, the third and fourth oppositely directed surfaces may be substantially symmetrical about a plane that extends substantially along a same direction as a direction along which the body and the attachment component move together and apart.

Alternatively or in addition, the third and fourth oppositely directed surfaces may be inclined towards each other away from the proximal portion of the protrusion.

Alternatively or in addition, the third and fourth oppositely directed surfaces may form short sides of the protrusion.

The recess may have one or more features of the protrusion as described above, e.g. in respect of the first to fourth oppositely directed surfaces. References to convex in respect of the protrusion should be read as references to concave.

Alternatively or in addition, the body and the attachment component may be configured to restrict rotation of the body and the attachment component about an axis substantially orthogonal to a direction along which the body and the attachment component move apart and together.

Alternatively or in addition, the component (i.e. the body or the attachment component) having the protrusion may comprise a base portion extending away from a proximal end of the protrusion, the base portion extending in a direction substantially orthogonal to the direction along which the body and the attachment component move apart and together.

Alternatively or in addition, the protrusion may comprise a cylindrical member extending away from a distal end of the protrusion, the recess defining a cylindrical recess configured to provide a snug fit for the cylindrical member when the protrusion is received in the recess.

Alternatively or in addition, the fastener may comprise a magnet and a fastener member comprising ferromagnetic material, the magnet being disposed in one of the body and the attachment component and the fastener member being disposed in the other of the body and the attachment component.

More specifically, the magnet may be enclosed by the one of the body and the attachment component, such that a magnetic field extends beyond one of: the protrusion; and a surface defining the recess.

Alternatively or in addition, a casing of at least one of the body and the attachment component may be formed at least in part of a stiff yet resilient material, e.g. a plastics material such as PCABS. The resilient property may provide for durability, e.g. as regards impact protection and wear sustained where the attachment arrangement is subject to vibration. The stiffness property may provide for effective mechanical coupling, e.g. of vibration, between the body and the attachment component.

Alternatively or in addition, a thickness of a wall of the protrusion towards a distal end of the protrusion may be less than a thickness of the wall elsewhere, e.g. a side wall of the protrusion. Where the fastener comprises a magnet, this may provide for strength of the protrusion whilst providing for effective coupling of the magnetic field across the distal end. Where the attachment arrangement comprises an RFID arrangement, this may provide for proper coupling of RFID signals between the body and the attachment component.

Alternatively or in addition, one of the body and the attachment component may comprise an RFID tag, such as a read/write RFID tag, and the other of the body and the attachment component may comprise an RFID antenna.

More specifically, the body may comprise the RFID tag. The RFID tag may be disposed within a space defined by the body. Where the body comprises the protrusion and a magnet forming part of a fastener, at least a part of the RFID tag may be closer to the proximal portion of the protrusion than a surface of the magnet closest to the proximal portion.

Alternatively or in addition and where the fastener comprises a magnet, each of the RFID tag and the RFID antenna may be disposed in its respective component (i.e. the body or the attachment component) such that when the protrusion is received in the recess the RFID antenna may be disposed on a same side of the magnet as at least part of the RFID tag.

Alternatively or in addition and where the fastener comprises a magnet and a fastener member, the attachment arrangement may further comprise a magnetic field operable switch, such as a Reed switch, and the magnet may comprise at least two magnet components spaced apart from each other and in a magnetically unclosed configuration such that a magnetic field emanating from the magnet is insufficient to actuate the magnetic field operable switch. When the protrusion is received in the recess, the attachment arrangement may be configured such that the fastener member magnetically closes the at least two magnet components to thereby increase the emanated magnetic field to an extent sufficient to actuate the magnetic field operable switch.

More specifically, where the attachment arrangement comprises an RFID tag and an RFID antenna, the attachment arrangement may be configured to operate in dependence on actuation of the magnetic field operable switch subject to communication between the RFID tag and the RFID antenna. Hence, there may be no operation of the attachment arrangement (e.g. in respect of processing of data) in the event of false switching of the magnetic field operable switch caused by, for example, an extraneous piece of metal near the magnet.

In a form, the body may be configured to be attached to an operative device, such as a power tool.

More specifically, the body may define an attachment surface configured to be held against an exterior surface of the operative device. The attachment surface may be planar. In use, the body may be attached to the operative device by means of double sided tape, adhesive or the like.

Alternatively or in addition, the body may define at least one aperture, the at least one aperture being configured to receive a cable grip or a band of a jubilee clip for attaching the body to the operative device.

The attachment component may form part of a sensor apparatus, such as a vibration sensor of a kind as described in WO 2007/072068. Thus, according to a second aspect of the present invention, there is provided sensor apparatus comprising an attachment arrangement according to the first aspect of the present invention.

Further embodiments of the second aspect may comprise one or more features of the first aspect of the present invention.

More specifically, the sensor apparatus may comprise at least one accelerometer. The at least one accelerometer may be mounted on a rigid member, e.g. a pcb. Where the attachment component comprises one of a magnet and a fastener member, the one of a magnet and a fastener member may be attached to the rigid member, e.g. by bonding by glue or double sided tape, to provide for rigid attachment.

More specifically, the one of a magnet and a fastener member may be disposed in the attachment component such that when the attachment component is engaged with the body there is a rigid mechanical coupling between the at least one accelerometer and the body. Thus, effective coupling of vibration of the body to the at least one accelerometer may be achieved.

According to a third aspect of the present invention, there is provided an operative device comprising an attachment arrangement according to the first aspect of the present invention.

The body of the attachment arrangement may form part, e.g. be integrally formed with, a casing of the operative device.

The operative device may be at least one of: a hand-held power tool; and a base component of the kind described in WO 2007/072068 having at least one bay for storage of an attachment component.

Further embodiments of the third aspect may comprise one or more features of the first or second aspects of the present invention.

According to a further aspect of the present invention, there is provided power tool apparatus comprising at least one power tool, the at least one power tool comprising a protrusion on the casing of the power tool, the protrusion defining a space accommodating a read/write RFID tag.

More specifically, the power tool apparatus may further comprise a user operable portable device comprising an RFID antenna, the user operable portable device being operable to read from and write to the RFID tag when the user operable portable device is disposed near the protrusion such that the RFID antenna is in wireless communication with the RFID tag.

The read/write tag may contain data representative of, for example, an identity of, usage of or ownership of the power tool. Thus, the user operable portable device may be used to read such data from the power tool. Also, the user operable portable device may be used to write fresh data, such as identity data or security data to facilitate full communication between the RFID tag and the RFID antenna, to the power tool.

Alternatively or in addition, one of the protrusion and the user operable portable device may comprise a magnet and the other of the protrusion and the user operable portable device may comprise a member of ferromagnetic material. Thus, the magnet and the member of ferromagnetic material may provide for proper registration of the user operable portable device with the protrusion. The user operable device may comprise a personal computer, such as a Personal Digital Assistant (PDA).

Alternatively or in addition, the protrusion may be integrally formed with the casing. Alternatively or in addition, the protrusion may be comprised in a body attached to the power tool.

The protrusion may have one or more features of the protrusion described above with reference to the first aspect of the present invention. The body, RFID tag and RFID antenna may have one or more features of the body, RFID tag and RFID antenna described above with reference to the first aspect of the present invention.

BRIEF DESCRIPTION OF THE DRAWINGS

Further features and advantages of the present invention will become apparent from the following specific description, which is given by way of example only and with reference to the accompanying drawings, in which.

SPECIFIC DESCRIPTION

Figure 1A:
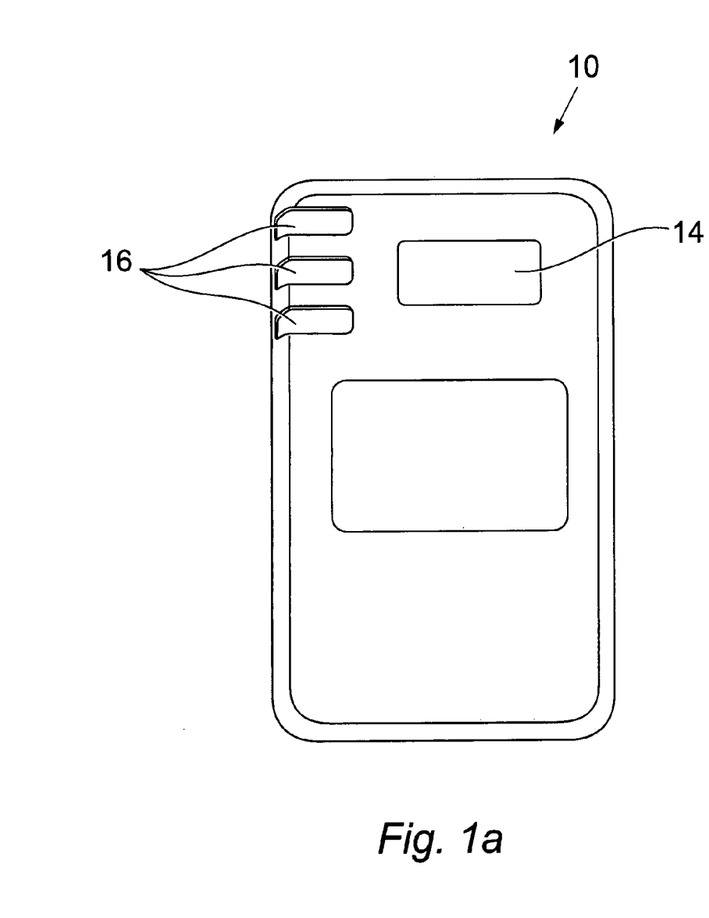
FIG. 1A shows a top view of a vibration sensor comprising an attachment component according to the present invention.
Figure 1B:
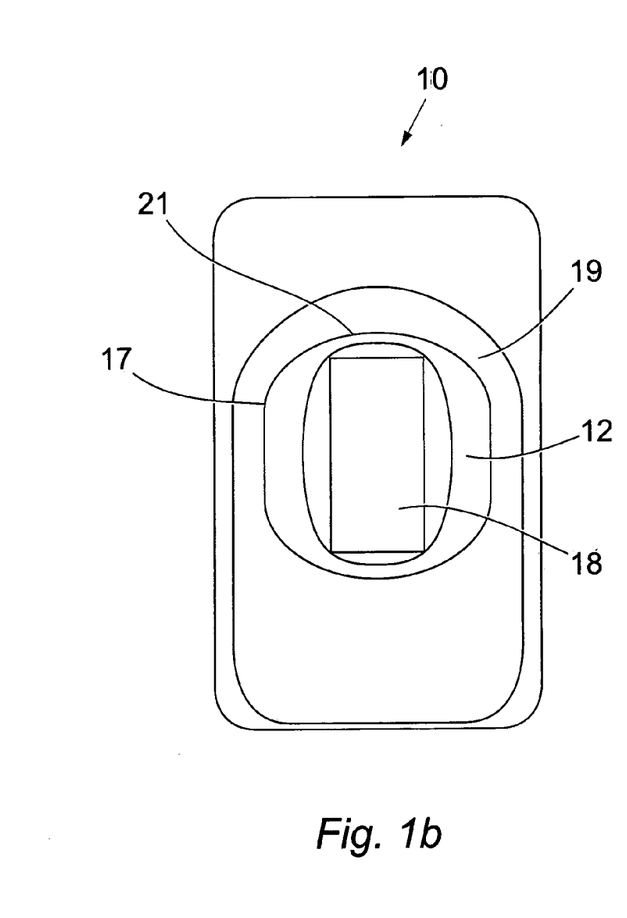
FIG. 1B shows an underside view of a vibration sensor comprising an attachment component according to the present invention.

A vibration sensor 10 (which constitutes a sensor apparatus) incorporating an embodiment of the present invention is shown in FIGS. 1A and 1B. FIG. 1A shows a top view of the vibration sensor 10 and FIG. 1B shows an underside view of the vibration sensor, which shows a recess 12 forming part of an attachment arrangement according to the present invention. The vibration sensor contains several accelerometers (not shown) oriented so as to measure vibrations in several axes and directions. The accelerometers are mounted on a rigid PCB to thereby provide for effective transmission of vibrations. The LCD display 14 and the Light Emitting Diodes (LEDs) 16 shown in FIG. 1A provide vibration level readings and status indications respectively. The vibration sensor is brought into use by being attached to a hand-held power tool (which constitutes an operative device), such as a drill, and is operative to measure vibration sustained by an operator when using the hand-held power tool. Reference should be made to WO 2007/072068 for a fuller explanation of the form and function of the sensor apparatus. As can be seen from FIG. 1B, a recess 12 is formed in the casing (which constitutes an attachment component) on the underside of the vibration sensor. The recess 12 is used to attach the vibration sensor to the power tool as described in more detail below with reference to FIG. 2. A fastener member 18 formed of a ferromagnetic material, such as a ferromagnetic metal, of rectangular form is received in an aperture provided in a bottom wall of the recess such that the upper surface of the fastener member 18 is substantially flush with the surface of the surrounding bottom wall. The PCB bearing the accelerometers is bonded by means of adhesive to the internal surface of the fastener member 18 to thereby provide for effective transmission of vibration from the body, which is described below with reference to FIG. 2, to the accelerometers.

Figure 2:
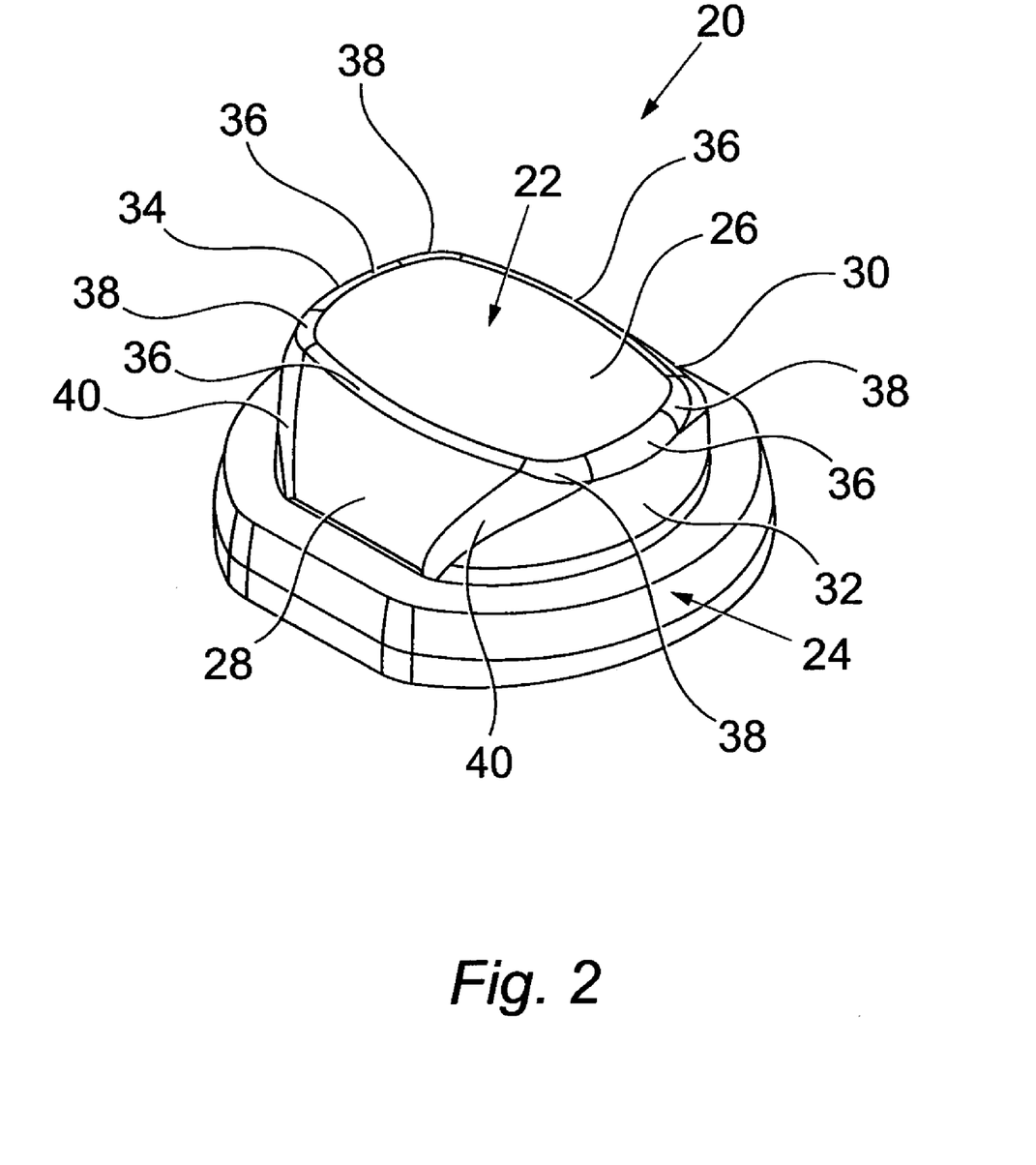
FIG. 2 shows a perspective view of a body according to the present invention.

A perspective view of a body 20 forming part of an attachment arrangement according to the present invention is shown in FIG. 2. The vibration sensor 10 and the body 20 together constitute an attachment arrangement according to the invention. The body 20 is brought into use by being attached to a hand-held power tool. The body may be attached to a surface of the power tool by means of double sided tape, adhesive or tape. In an un-illustrated form, the body is bonded to an assembly, which has two spaced apart apertures and a cable grip or a band of a jubilee clip is threaded through the apertures such that the cable grip or jubilee clip can be used to attach the body and the assembly to, for example, a handle of the power tool. The body 20 comprises a protrusion 22 and a base portion 24. The protrusion 22 has the same shape as the recess 12 shown in FIG. 1B and has dimensions such that the protrusion is a comparatively snug fit in the recess but not to the extent that, upon insertion of the protrusion in the recess, opposing sides of the recess both touch the protrusion and thereby present resistance to insertion.

The protrusion 22 of FIG. 2 defines surfaces profiles, which cooperate with the surface profiles of the recess 12 to provide for removal of the protrusion from the recess. The surface profiles of the protrusion 22 will now be described in detail. As can be seen from FIG. 2, the protrusion 22 has an asymmetric footprint in a plane extending substantially orthogonally to a direction in which the body 20 and the attachment component (i.e. the vibration sensor 10) move together and apart. The protrusion 22 defines a substantially first planar surface 26, which defines a furthest extent of the protrusion, and which lies in a plane that is substantially orthogonal to a direction along which the body 20 and the attachment component 10 move together and apart. The recess 12 of the attachment component (i.e. the vibration sensor 10) defines a second planar surface, which defines a greatest depth of the recess, and which lies in a plane that is substantially orthogonal to a direction along which the body 20 and the attachment component move together and apart. When the protrusion 22 is received in the recess 12 the first and second planar surfaces extend substantially parallel to each other and are adjacent each other.

The protrusion 22 of FIG. 2 also defines first 28 and second 30 oppositely directed surfaces, which face in generally opposite directions. Each of the first 28 and second 30 oppositely directed surfaces is arcuate such that each defines a convex surface. The first 28 and second 30 oppositely directed surfaces are substantially mirror images of each other. The first 28 and second 30 oppositely directed surfaces are increasingly inclined towards each other as one progresses across the surfaces away from the base 24 towards the first planar surface 26 at the distal end of the protrusion. Each of the first 28 and second 30 oppositely directed surfaces describes a path, with each path describing part of an ellipse having an eccentricity of more than zero, with the path lying in a plane that is substantially orthogonal to a direction along which the body and attachment component move together and apart. The thus described configuration of the surfaces 28, 30 provides for relative rotation of the body and the attachment component whilst forcing the body and the attachment component progressively apart as they rotate. Also, each of the first 28 and second 30 oppositely directed surfaces describes another path, with each other path describing part of an ellipse, with the other path lying in a plane that is substantially parallel to a direction along which the body and attachment component move together and apart. Thus, radii of curvature of the first 28 and second 30 oppositely directed surfaces when one moves across each surface in a direction parallel to the first planar surface 26 vary progressively, with a radius of curvature at a centre of the surface being greater than towards an end of the surface. The first 28 and second 30 oppositely directed surfaces form long sides of the protrusion 22.

The protrusion 22 of FIG. 2 also defines third 32 and fourth 34 oppositely directed surfaces, which face in generally opposite directions. Each of the third 32 and fourth 34 oppositely directed surfaces face generally perpendicularly to the first and second oppositely directed surfaces. Each of the third 32 and fourth 34 oppositely directed surfaces are arcuate such that each defines a convex surface that is convex along one axis and such that opposing ends of the third and fourth oppositely directed surfaces are closer to each other than the centres of the third and fourth oppositely directed surfaces. A radius of curvature of each of the third 32 and fourth 34 oppositely directed surfaces may be substantially 14.5 mm. Each of the third 32 and fourth 34 oppositely directed surfaces describes part of the same substantially circular path in a plane that extends substantially orthogonally to a direction along which the body and the attachment component move together and apart. There is substantially no curvature of each of the third 32 and fourth 34 oppositely directed surfaces along a direction between the base 24 and the first planar surface 26. Each of the third 32 and fourth 34 oppositely directed surfaces extends at an angle of substantially 3.6° to the direction along which the body and the attachment component (i.e. the vibration sensor) move together and apart. Thus, the third 32 and fourth 34 oppositely directed surfaces are inclined towards each other towards the first planar surface. The third 32 and fourth 34 oppositely directed surfaces form short sides of the protrusion 22.

As can be seen from FIG. 2, the base portion 24 extends away from the proximal end of the protrusion. The base portion extends in a direction substantially orthogonal to the direction along which the body and the attachment component move together and apart. In use, the base portion 24 restricts relative rotation of the body 20 and the attachment component 10 about an axis substantially orthogonal to a direction along which the body and the attachment component move together and apart. In an unillustrated form, a cylindrical member is provided in the centre of the first planar surface 26 in addition to or instead of the base portion 24. A corresponding cylindrical recess is formed in the centre of the second planar surface of the recess 12 such that when the protrusion 22 is received in the recess 12, the cylindrical member is received in the cylindrical recess to thereby restrict relative rotation of the body 20 and the attachment component 10 about an axis substantially orthogonal to a direction along which the body and the attachment component move together and apart.

The protrusion 22 also comprises a chamfer 36 at each of: the edge between the first planar surface 26 and the first oppositely directed surface 28; the edge between the first planar surface 26 and the second oppositely directed surface 30; the edge between the first planar surface 26 and the third oppositely directed surface 32; and the edge between the first planar surface 26 and the fourth oppositely directed surface 34. A chamfer 38 is provided at the corner of: the first planar surface 26, the first oppositely directed surface 28 and the third oppositely directed surface 32; the first planar surface 26, the first oppositely directed surface 28 and the fourth oppositely directed surface 34; the first planar surface 26, the second oppositely directed surface 30 and the third oppositely directed surface 32; and the first planar surface 26, the second oppositely directed surface 30 and the fourth oppositely directed surface 34. The protrusion 22 also comprises a chamfer 40 at each of: the edge between the first oppositely directed surface 28 and the third oppositely directed surface 32; the edge between the first oppositely directed surface 28 and the fourth oppositely directed surface 34; the edge between the second oppositely directed surface 30 and the third oppositely directed surface 32; and the edge between the second oppositely directed surface 30 and the fourth oppositely directed surface 34.

The protrusion 22 has a height including the base portion 24 of substantially 13.9 mm. The height of the protrusion is substantially 8.2 mm. The width of the proximal end of the protrusion between the first and second oppositely directed surfaces is substantially 25.75 mm. The width of the proximal end of the protrusion between the third and fourth oppositely directed surfaces is substantially 28.75 mm.

The protrusion defines an internal space (not shown), which contains a magnet (not shown). The magnet is disposed in the internal space such that is located immediately behind the wall that defines the first planar surface 26. When the protrusion 22 is fully received in the recess 12, the magnet attracts the fastener member 18 thereby presenting resistance to removal of the protrusion from the recess and thereby separation of the body 20 and the attachment component (i.e. the vibration sensor 10) from each other. The magnet and the fastener member 18 together constitute a fastener that is operative to resist separation of the body and the attachment component. When it is desired to separate the body 20 and the attachment component 10, the body is rotated relative to the attachment component about an axis that extends in a direction that is substantially the same as a direction along which the body and the attachment component move together and apart when the protrusion is being received in and removed from the recess. Relative rotation of the body 20 and the attachment component 10 causes surface profiles of the protrusion 22 and the attachment component 10 to cooperate with each other to force the body and the attachment component progressively apart against the attraction of the magnet and the fastener member 18. Considering the relative rotation further, when the body 20 is rotated anti-clockwise (with the direction being determined by viewing the vibration sensor, i.e. the attachment component, as shown in FIG. 1B) in relation to the attachment component 10, a location 17 (see FIG. 1A) at a corner of the recess 12 travels progressively along an edge 24 (see FIG. 2) (which constitutes a surface profile) of the protrusion. When the body is rotated clockwise the edge 24 of the protrusion and the curved surface 21, which constitutes a third or fourth oppositely directed surface and which extends from the location 17 at the corner of the recess, travel progressively along each other.

The internal space in the protrusion 22 also accommodates two read/write RFID tags (not shown). Two RFID tags are provided for redundancy to thereby increase reliability. A first of the two RFID tags (a Sokymat 626600 from ASSA ABLOY Identification Technologies Switzerland SA of Z.I Rte-Pra Charbon27, 1614 Granges, Switzerland) is disposed in the internal space such that it is on the other side of the magnet to the first planar surface 26 and such that it overlaps in part with the magnet. A second of the two RFID tags (a CoreRFID WON018 from CoreRFID Ltd of Dallam Court, Dallam Lane, Warrington, UK, WA2 7LT) is disposed in the internal space such that it is to one side of the magnet. An RFID antenna (not shown) is disposed within an internal space defined in the vibration sensor 10 such that the RFID antenna surrounds the recess 12 and is located close to an anterior surface 19 of the casing of the vibration sensor surrounding the recess 12.

Figure 3:
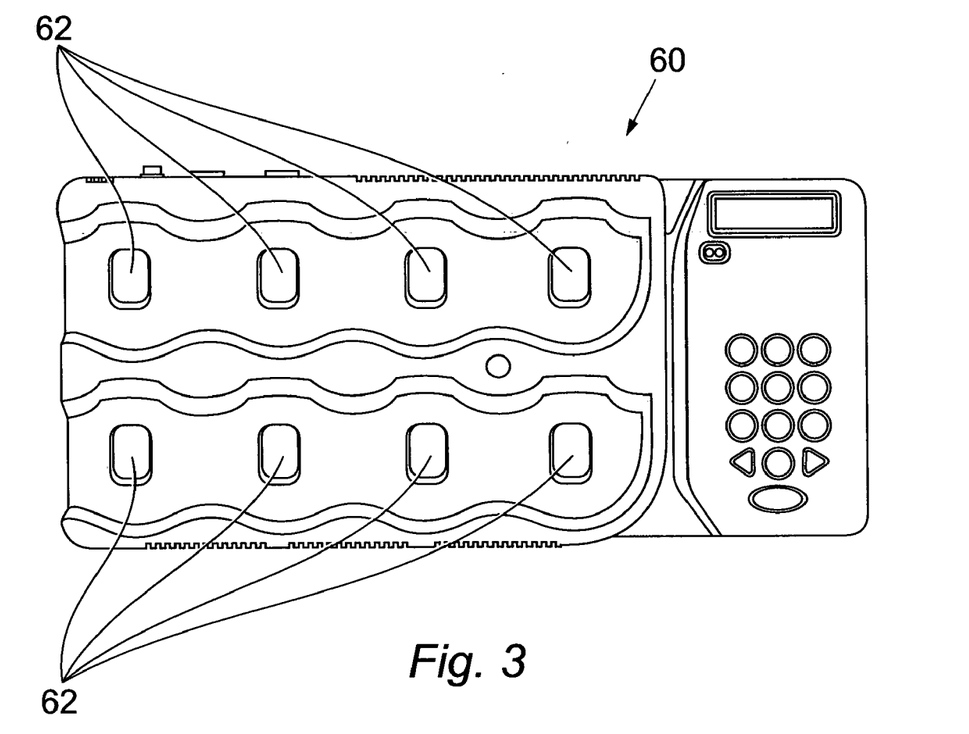
FIG. 3 shows a base station comprising bodies according to the present invention formed integrally with the casing of the base station.

A base station 60 (which constitutes a base component) is shown in FIG. 3. The base station comprises a number of protrusions 62 each of which has the same form and mechanical function as the protrusion 22 described with reference to FIG. 2. Each of several vibration sensors 10, as described above with reference to FIGS. 1A and 1B, are attached to a respective protrusion 62. The protrusions 62 are formed integrally with the casing of the base station 60. The base station 60 is operative to receive, store and process data from vibration sensors and to recharge a battery contained within each vibration sensor as described in detail in WO 2007/072068. Recharging of the battery is by means of inductive power coupling between the vibration sensor and the base station. The base station defines a planar surface beside the protrusion and the vibration sensor defines a planar surface beside the recess and the planar surfaces abut so as to provide for close proximity of the inductive power coupling components in each of the base station and the vibration sensor. The base station contains a Reed switch located proximately to the internal space defined by each protrusion 62. Also, the magnet contained in the internal space of the protrusion 62 has a magnetically unclosed configuration. More specifically, the magnet comprises two neodymium magnet members (of 9.8 mm×9.8 mm×6 mm) spaced apart by substantially 3 mm and connected by means of a substantially 3 mm thick steel plate on sides of the magnet members disposed on the side away from the first planar surface 26 and in a plane substantially parallel to the first planar surface. This provides a force between the magnet and the fastener member of between 30 N and 40 N for a separation between the magnet and the fastener member of between 0.7 mm and 1 mm with a fastener member having a thickness of substantially 4 mm. In the magnetically unclosed configuration the magnetic field emanating from the magnet is insufficient to actuate the Reed switch. When a vibration sensor 10 is attached to the protrusion, the fastener member 18 is operative to magnetically close the magnet members to thereby increase the emanated magnetic field to an extent sufficient to actuate the Reed switch. The base station 60 is also configured by means of firmware to determine whether or not there is RFID communication between the protrusion 62 and the vibration sensor 10 and to execute certain firmware procedures in dependence upon both actuation of the Reed switch and such RFID communication. This prevents accidental actuation of the Reed switch, e.g. by means of a piece of ferromagnetic metal dropped on the base station.

The body 20 and the vibration sensor 10 have casings formed of PCABS, which provides for resilience and hence durability, and stiffness, which provides for effective coupling of vibrations. A thickness of casing wall at the first planar surface 26 of the protrusion 22 and the second planar surface of the recess 12 is thinner than elsewhere. The thinner walls at the first and second planar surfaces present less of a separation between the magnet and the fastener member 18 to thereby provide for effective magnetic coupling between the magnet and the fastener member.

Figure 4:
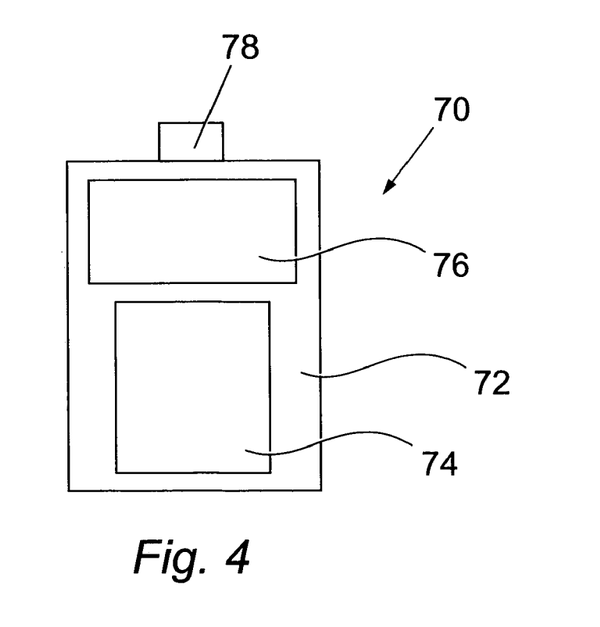
FIG. 4 is a representation of a reader device for use with the body of the present invention.

FIG. 4 shows a reader device 70. The reader device 70 comprises a Personal Digital Assistant (PDA) 72 having, in accordance with conventional practice, a keyboard 74 and a screen 76. The reader device also comprises an interface 78 (Wireless Dynamics SDiD 1020 from Wireless Dynamics Inc. of Suite 220, 3636-23 Street N.E., Calgary, Alberta, Canada, T2E 8Z5) in the communications port of the reader device. The interface 78 is shaped so that it can be brought close to or laid against the first planar surface 26 of the protrusion 22. The interface 78 also comprises an RFID antenna and is configured by means of firmware for communication with the read/write RFID tag contained in the protrusion. In use, the reader device is operative to read from the RFID tag to determine the identity of the tool to which the body 20 is attached. The reader device is also operative to write data to the RFID tag, such as data that allows for RFID communication between the body and the vibration sensor.

Figure 5A:
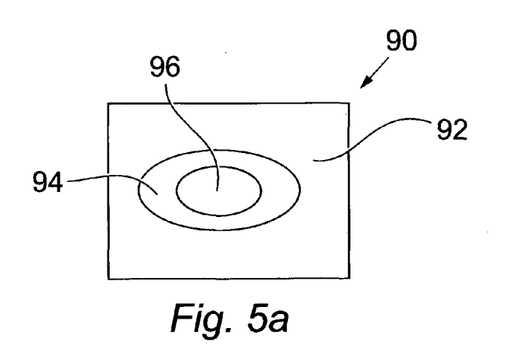
FIGS. 5A, 5B and 5C are plan and first and second side views of a body according to a second embodiment of the present invention.
Figure 5B:
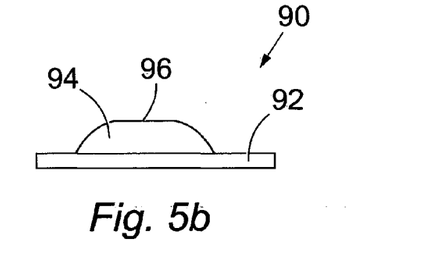
Figure 5C:
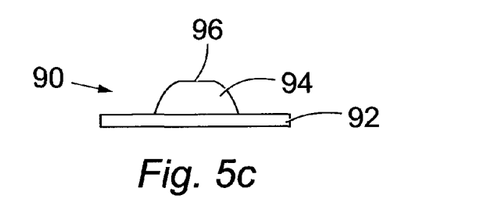

A body 90 according to a second embodiment of the present invention is shown in plan view in FIG. 5A. A first side view of the body 90 is shown in FIG. 5B. A second side view of the body 90 is shown in FIG. 5C after rotation through 90 degrees from the disposition shown in FIG. 5B. Like the body 20 of FIG. 2, the body 90 of FIGS. 5A to 5C comprises a base portion 92 and a protrusion 94. A first planar surface 96 is defined at the distal end of the protrusion 94. As can be seen from FIG. 5A the protrusion defines an elliptical footprint having an eccentricity of more than zero. The first planar surface 96 also defines an elliptical footprint having an eccentricity of more than zero. As can be seen in the side views of FIGS. 5B and 5C the sides of the protrusion 94 are arcuate with opposing sides being increasingly inclined towards each other towards the first planar surface 96. A recess (not shown) formed in a vibration sensor will have a same shape as the protrusion of FIGS. 5A to 5C and have dimensions such that the protrusion 94 is a snug fit in the recess. The protrusion of FIGS. 5A to 5C and its corresponding recess operate in the same way as described above for the first embodiment. More specifically, the surface profiles of the protrusion 94 and the recess cooperate with each other upon relative rotation of the body 90 and the vibration sensor 10 to force the body and vibration sensor apart against the force exerted by the magnet.

Figure 6A:
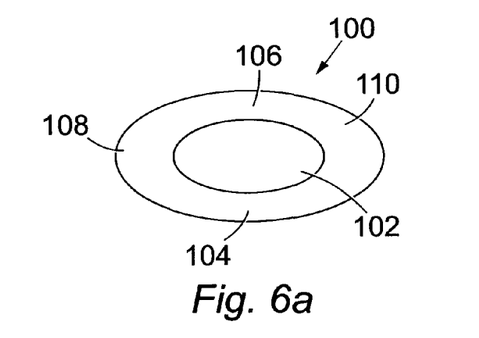
FIGS. 6A and 6B are plan and perspective views of a body according to a third embodiment of the present invention.
Figure 6B:
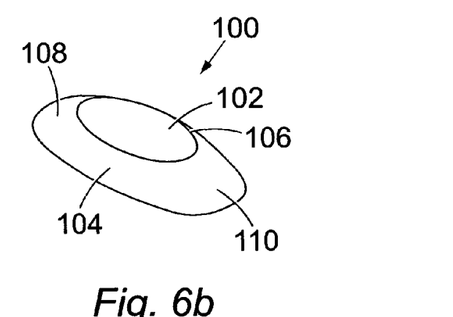

A protrusion 100 according to a third embodiment of the present invention is shown in plan view in FIG. 6A and in perspective view in FIG. 6B.

Although not shown in FIGS. 6A and 6B the protrusion extends from a base portion either like the base portion of FIG. 2 or the base portion of FIGS. 5A to 5C. A first planar surface 102 is defined at the distal end of the protrusion 100. The protrusion comprises first 104 and second 106 oppositely directed surfaces each of which describes part of the same elliptical path having an eccentricity of more than zero. The protrusion also comprises third 108 and fourth 110 oppositely directed surfaces each of which describes part of the same elliptical path having a characteristic different to the elliptical path described by the first 104 and second 106 oppositely directed surfaces. As can be appreciated from FIG. 6B the oppositely directed surfaces are arcuate with opposing surfaces being inclined towards each other towards the first planar surface 102. A recess (not shown) formed in a vibration sensor will have a same shape as the protrusion of FIGS. 6A and 6B and have dimensions such that the protrusion 100 is a snug fit in the recess. The protrusion of FIGS. 6A and 6B and its corresponding recess operate in the same way as described above for the first and second embodiments.

Figure 7A:
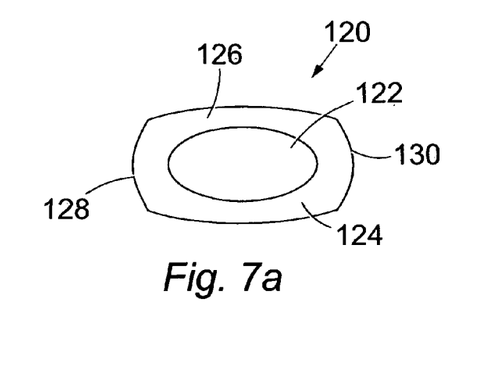
FIGS. 7A and 7B are plan and side views of a body according to a fourth embodiment of the present invention.
Figure 7B:
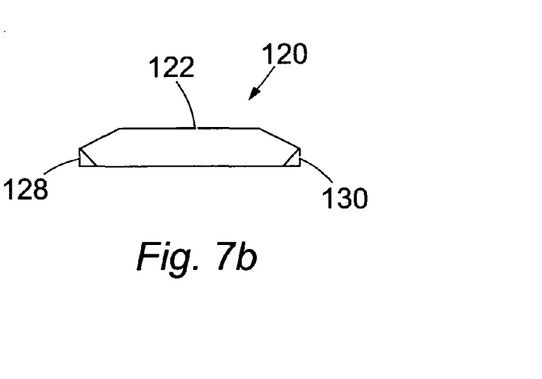

A protrusion 120 according to a fourth embodiment of the present invention is shown in plan view in FIG. 7A and in side view in FIG. 7B. Although not shown in FIGS. 7A and 7B the protrusion extends from a base portion either like the base portion of FIG. 2 or the base portion of FIGS. 5A to 5C. A first planar surface 122 is defined at the distal end of the protrusion 120. The embodiment of FIGS. 7A and 7B constitutes a truncated form of the embodiment of FIGS. 6A and 6B. More specifically, the first 124 and second 126 oppositely directed surfaces are as in FIGS. 6A and 6B and the third 128 and fourth 130 oppositely directed surfaces describe parts of a same circular path, which extends in a plane substantially orthogonally of the direction in which the protrusion and the recess are moved together and apart. In addition, the third 128 and fourth 130 oppositely directed surfaces extend from the base portion (not shown) in substantially a same direction as the direction in which the protrusion and the recess are moved together and apart. As with the embodiment of FIG. 6B the first 124 and second 126 oppositely directed surfaces are arcuate with opposing surfaces being inclined towards each other towards the first planar surface 122. A recess (not shown) formed in a vibration sensor will have a same shape as the protrusion of FIGS. 7A and 7B and have dimensions such that the protrusion 120 is a snug fit in the recess. The protrusion of FIGS. 7A and 7B and its corresponding recess operate in the same way as described above for the first to third embodiments.

The invention claimed is:

1. An attachment arrangement comprising:
a body;
an attachment component;
a fastener;
one of the body and the attachment component defining a protrusion and the other of the body and the attachment component defining a recess configured to receive the protrusion;
wherein the fastener is operative to resist separation of the body and the attachment component when the protrusion is received in the recess;
wherein each of the protrusion and the recess defines a surface profile, the surface profiles cooperating with each other to force the body and the attachment component progressively apart from each other against the operation of the fastener as the body and the attachment component are rotated in relation to each other when the protrusion is received in the recess;
wherein the body and the attachment component are rotated about an axis that extends in substantially a same direction as a direction in which the body and the attachment component move together and apart when the protrusion is being received in and removed from the recess.

2. An attachment arrangement according to claim 1, wherein the protrusion and the recess have substantially a same shape.

3. An attachment arrangement according to claim 1, wherein respective surfaces of the protrusion and the recess are adjoining when the protrusion is fully received in the recess.

4. An attachment arrangement according to claim 1, wherein at least one of the protrusion and the recess has an asymmetric footprint in a plane extending substantially orthogonally to a direction in which the body and the attachment component move apart and together.

5. An attachment arrangement according to claim 1, wherein at least one of the protrusion and the recess has a surface profile that describes at least part of an ellipse having an eccentricity of more than zero, the surface profile lying in a plane that extends substantially orthogonally to a direction in which the body and the attachment component move apart and together.

6. An attachment arrangement according to claim 5, wherein each of at least one of the protrusion and the recess has two surface profiles, each surface profile describing part of a same ellipse having an eccentricity of more than zero.

7. An attachment arrangement according to claim 1, wherein the protrusion defines a substantially first planar surface and the recess defines a substantially second planar surface, each of the first and second planar surfaces extending substantially parallel to each other and being adjacent to each other when the protrusion is received in the recess, the first planar surface defining a furthest extent of the protrusion and the second planar surface defining a greatest depth of the recess, each of the first and second planar surfaces lying in a respective plane that is substantially orthogonal to a direction along which the body and attachment component move apart and together.

8. An attachment arrangement according to claim 1, wherein the protrusion defines a first oppositely directed surface and a second oppositely directed surface, the first and second oppositely directed surfaces facing in generally opposite directions, each of the first and second oppositely directed surfaces being arcuate such that each defines a convex surface and radii of curvature of each of the first and second oppositely directed surfaces varies progressively along the surface in a direction orthogonal to the radii of curvature such that a radius of curvature is greater at a centre of the surface than a radius of curvature towards ends of the surface.

9. An attachment arrangement according to claim 8, wherein the first and second oppositely directed surfaces are inclined towards each other when progressing across the surfaces towards a distal portion of the protrusion.

10. An attachment arrangement according to claim 8, wherein the first and second oppositely directed surfaces form long sides of the protrusion.

11. An attachment arrangement according to claim 1, wherein the protrusion defines third and fourth oppositely directed surfaces, the third and fourth oppositely directed surfaces facing in generally opposite directions, each of the third and fourth oppositely directed surfaces facing generally perpendicularly to the first and second oppositely directed surfaces and each of the third and fourth oppositely directed surfaces being arcuate such that each defines a convex surface.

12. An attachment arrangement according to claim 11, wherein each of the third and fourth oppositely directed surfaces describe a substantially circular path in part in a plane extending substantially orthogonally to a direction along which the body and the attachment component move apart and together, the circular path described by the third and fourth oppositely directed surfaces having substantially a same radius of curvature.

13. An attachment arrangement according to claim 11, wherein the third and fourth oppositely directed surfaces are inclined towards each other in a direction away from a proximal portion of the protrusion.

14. An attachment arrangement according to claim 1, wherein the third and fourth oppositely directed surfaces form short sides of the protrusion.

15. An attachment arrangement according to claim 1, wherein a component has the protrusion comprises a base portion extending away from a proximal end of the protrusion, the base portion extending in a direction substantially orthogonal to the direction along which the body and the attachment component move apart and together.

16. An attachment arrangement according to claim 1, wherein the fastener comprises a magnet and a fastener member comprising ferromagnetic material, the magnet being disposed in one of the body and the attachment component and the fastener member being disposed in the other of the body and the attachment component.

17. An attachment arrangement according to claim 16, wherein the attachment arrangement further comprises a magnetic field operable switch and the magnet comprises at least two magnet components spaced apart from each other and in a magnetically unclosed configuration such that a magnetic field emanating from the magnet is insufficient to actuate the magnetic field operable switch, the attachment arrangement being configured such that when the protrusion is received in the recess the fastener member magnetically closes the at least two magnet components to thereby increase the emanated magnetic field to an extent sufficient to actuate the magnetic field operable switch.

18. An attachment arrangement according to claim 17 comprising:
- an RFID tag;
- an RFID antenna; and
- wherein the attachment arrangement is configured to process electronic data in dependence on actuation of the magnetic field operable switch and subject to communication between the RFID tag and the RFID antenna.

19. Sensor apparatus comprising an attachment arrangement, the attachment arrangement comprising:
- a body;
- an attachment component;
- a fastener;
- one of the body and the attachment component defining a protrusion and the other of the body and the attachment component defining a recess configured to receive the protrusion;
- wherein the fastener is operative to resist separation of the body and the attachment component when the protrusion is received in the recess;
- wherein each of the protrusion and the recess defines a surface profile, the surface profiles cooperating with each other to force the body and the attachment component progressively apart from each other against the operation of the fastener as the body and the attachment component are rotated in relation to each other when the protrusion is received in the recess; and
- wherein the body and the attachment component are rotated about an axis that extends in substantially a same direction as a direction in which the body and the attachment component move together and apart when the protrusion is being received in and removed from the recess.

20. A hand-held tool comprising an attachment arrangement, the attachment arrangement comprising:
- a body;
- an attachment component;
- a fastener;
- one of the body and the attachment component defining a protrusion and the other of the body and the attachment component defining a recess configured to receive the protrusion;
- wherein the fastener is operative to resist separation of the body and the attachment component when the protrusion is received in the recess;
- wherein each of the protrusion and the recess defines a surface profile, the surface profiles cooperating with each other to force the body and the attachment component progressively apart from each other against the operation of the fastener as the body and the attachment component are rotated in relation to each other when the protrusion is received in the recess; and
- wherein the body and the attachment component are rotated about an axis that extends in substantially a same direction as a direction in which the body and the attachment component move together and apart when the protrusion is being received in and removed from the recess.

* * * * *